Patented Jan. 30, 1951

2,539,737

UNITED STATES PATENT OFFICE 2,539,737

MIXTURES OF THIOINDIGOID DYESTUFFS

Fritz Grieshaber, Riehen, Switzerland, assignor to Ciba Limited, Basel, Switzerland, a Swiss firm No Drawing. Application October 2, 1944, Serial No. 556,906. In Switzerland October 28, 1943

1 Claim. (Cl. 260—332)

The present invention is concerned with new mixtures of thioindigoid dyestuffs, i. e. dyestuffs containing the grouping

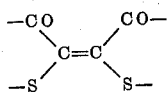

the single components of the said mixtures being in part known. More particularly the present invention is concerned with mixtures of isomeric thioindigoid dyestuffs, which mixtures behave like a uniform dyestuff. It is an object of the present invention to provide such mixtures which can be obtained in a simpler and more economical way than the single components. Other objects will appear as the specification proceeds. For the sake of convenience the dyestuff mixtures will be referred to as dyestuffs in the specification.

It has been found that indigoid dyestuffs can be produced by coupling mixtures of halogenated 7-methyl-3-hydroxythionaphthenes whose halogen atom is attached partly in 6- and partly in 4-position, if desired in the form of reactive derivatives, with components suitable for the manufacture of thioindigoid dyestuffs.

The mixtures of 7-methyl-6-halogen-3-hydroxythionaphthenes and 7-methyl-4-halogen-3-hydroxythionaphthenes serving as starting materials for the present process which contain preferably chlorine as halogen, may be obtained in known manner from mixtures of 2-nitro-6-halogen-1-methylbenzenes and 2-nitro-4-halogen-1-methylbenzenes (cf. for example Helvetica Chimica Acta, 1929, vol. 12, pages 931–32). It is particularly valuable that the mixtures of 4- or 6-chloro-2-nitro-1-methylbenzene formed on chlorinating ortho-nitrotoluene, which may contain for example approximately ⅓ of the isomer chlorinated in 4-position, can be used directly. As is known, the two isomers can be separated only with loss of material and in a relatively circumstantial process. Working up said mixtures then leads to mixtures of 6-chloro- and 4-chloro-7-methyl - 3 - hydroxythionaphthenes, which may be used as starting materials for the present process.

Mixtures of hydroxythionaphthenes of this kind in which the relative proportion of the 4-halogen compound may amount up to 50 per cent., can be coupled in known manner with thioindigoid components to form dyestuffs.

As is well known asymmetrical thioindigoid dyestuffs are commonly prepared by condensing e. g. a hydroxythionaphthene (or an α-carboxylic acid thereof, which behaves alike and is intended to be included in the said term) with a reactive α-derivative of a hydroxythionaphthene. The term thioindigoid component comprises all these compounds, but it is to be understood that one of the two ocmponents used for the manufacture should be in the oxidation stage of the hydroxythionaphthene.

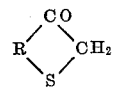

and the other in the oxidation stage of the quinone

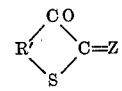

wherein Z means a bivalent radical capable of being split off and capable of binding hydrogen, such as an anil radical. As usual the last named components will be called reactive α-derivatives of hydroxythionaphthenes.

As thioindigoid components for the present process there can be used preferably those of the hydroxythionaphthene series, further also those of the naphthoxythiophene series; there are named for example para-dimethylaminoanils of 4-methyl-6-chloro-thionaphthenequinone, of 5-chloro-4:7-dimethylthionaphthenequinone, of 5-chloro - 7 - methyl-thionaphthenequinone, of 1-chloro-2:3-naphth-thioisatine as well as the 2:1 naphth-thioisatine.

The above mentioned hydroxythionaphthene mixtures can also be converted in known manner into reactive derivatives, for example into the corresponding mixtures of para-dimethylaminoanils, and condensed in this form, e. g. with hydroxythionaphthenes.

All these reactions may be carried out as usual in indifferent solvents or diluents, such as chlorobenzene, alcohol, sulfuric acid, etc.

It is known to condense pure 6-chloro-7-methyl-3-hydroxy-thionaphthene or its reactive derivatives with indigoid components. According to the present process which uses the much more easily obtainable mixtures of isomers instead of the pure hydroxythionaphthenes, dyestuffs are produced which, in a surprising manner, with regard to their properties are hardly different from the dyestuffs obtained according to the known process from pure 6-chloro-7-methyl-3-hydroxythionaphthene. For example the dyestuff obtained according to the present process from a mixture of 6 - chloro-7-methyl-3-hydroxythionaphthene and 4-chloro-7-methyl - 3 - hydroxy - thionaphthene and the para-dimethylaminoanil of 4-methyl-6-chloro-thionaphthenequinone produces dyeings of the same purity and fastness as the dyestuff prepared from pure 6-chloro-7-methyl-3-hydroxythionaphthene and 4-methyl-6-chlorothionaphthenequinone - para - dimethylaminoanil, whereas the dyestuff from 4-chloro-7-methyl-3-hydroxythionaphthene and the same anil yields dyeings which are less pure and have an essentially inferior fastness to soaping. Contrary to the general rule that a dyestuff mixture possesses the fastness properties of the inferior mixing component, dyestuff mixtures are obtained in the present process in which the inferior properties of the one mixing component are repressed by the better properties of the other component.

The dyestuffs obtained according to the present process are suitable for dyeing and particularly also for printing the most different materials, for example also animal fibers such as silk or wool, particularly, however, fibers containing cellulose, such as cotton, linen, rayon and regenerated cellulose staple fiber, and also superpolyamide fibers. Especially red shades possessing good fastness properties are obtained thereby. The present process also permits, inter alia, the manufacture of pure dyestuffs dyeing blue red to rose colored shades.

The dyestuffs obtained according to the present process can be converted by known processes into leuco ester salts of polybasic acids, for example of sulfuric acid, and this by starting from the leuco compounds produced in a separate operation and also by starting from the dyestuffs themselves by using agents yielding SO₃, such as chlorosulfonic acid, in the presence of metals, such as iron or copper, preferably by using tertiary bases, such as pyridine or homologues of pyridine, as solvents.

The following examples illustrate the invention, the parts being by weight:

*Example 1*

19.85 grams of a dry mixture of 6-chloro-7-methyl-3-hydroxythionaphthene and 4-chloro-7-methyl-3-hydroxythionaphthene are dissolved in 500 cc. of chlorobenzene together with 33.05 grams of 4-methyl-6-chlorothionaphthenequinone-para-dimethylaminoanil and the solution is stirred for 10 to 14 hours at 80–82° C. The dyestuff which is obtained in good yield is filtered off and washed with chlorobenzene.

The dyestuff containing components of the formulae

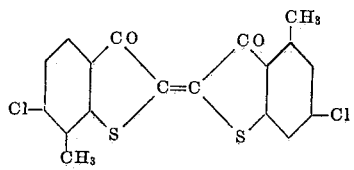

and

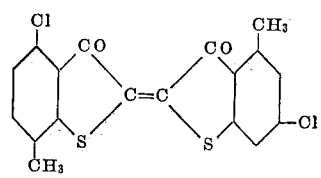

is a rose colored powder which dyes cotton from a reddish yellow vat pure rose colored shades of very good fastness. It can also be used very well for printing. The dyestuff can also be used in the form of the leuco sulfuric acid ester.

The same dyestuff is obtained when first converting the same mixture of hydroxythionaphthenes into a mixture of the corresponding para-dimethylaminoanils and condensing this mixture with 4-methyl-6-chloro-3-hydroxythionaphthene or its carboxylic acid.

The hydroxythionaphthene mixture used in the present example can be obtained as follows:

Ortho-nitrotoluene is chlorinated at a moderate temperature in the presence of halogen carriers. A mixture is obtained which contains approximately 66 per cent. of 6-chloro-2-nitro-1-methylbenzene and approximately 34 per cent. of 4-chloro-2-nitro-1-methylbenzene. This mixture is reduced, the amine mixture obtained is diazotized, caused to react with xanthogenates and worked up in the usual maner to the mixture of the corresponding hydroxythionaphthenes.

It is obvious that by chance or by purposely separating part of one isomer in any desired stage of the process the relative proportion of the isomers may be different. Whereas a low proportion of the isomer containing chlorine in 4-position is of no harm, proportions of the said isomer exceeding 50 per cent. should be avoided.

*Example 2*

19.85 grams of the dry hydroxythionaphthene mixture used in Example 1 and 34.45 grams of 5-chloro-4:7 - dimethyl-thionaphthenequinone-para-dimethylaminoanil are stirred for 12 hours at 80–82° C. in 400 cc. of chlorobenzene. The red dyestuff obtained in good yield containing the components

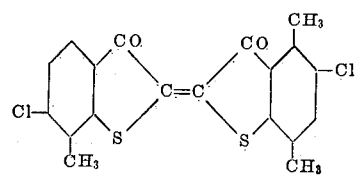

and

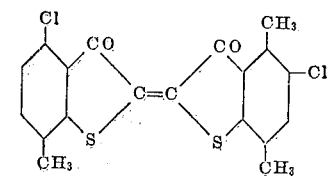

produces on cotton and other textile materials containing cellulose powerful red shades having good fastness properties. The dyeing corresponds to that obtained with the dyestuff from pure 6-chloro-7-methylthioindoxyl.

*Example 3*

19.85 grams of the hydroxythionaphthene mixture used in Example 1 and 36.6 grams of para-dimethylaminoanil of the 1-chloro-2:3-naphththioindoxyl are stirred for 14 hours at 80–84° C. in 500 cc. of chlorobenzene. The violet dyestuff obtained in good yield containing the components

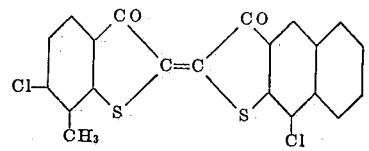

and

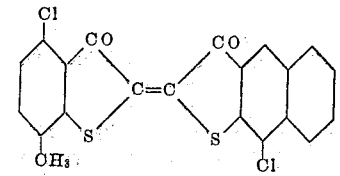

is filtered off and washed with the solvent. It dyes cotton and other textile materials beautiful violet shades having very good fastness properties, similar to those obtained with the dyestuff from pure 6-chloro-7-methyl-3-hydroxythionaphthene.

A dyestuff dyeing bordeaux shades is obtained if 33.2 grams of the para-dimethylaminoanil of 2,1-naphththioindoxyl are used instead of the para-dimethylaminoanil of 1-chloro-2,3-naphththioindoxyl.

*Example 4*

1 part of the dyestuff obtained according to Example 1 is stirred with 150 parts of water and 4 parts by volume of caustic soda solution of 36° Bé. and vatted at about 80° C. by addition of 2 parts of sodium hydrosulfite. This stock vat is added to a dye-bath which contains in 2800 parts of water 8 parts by volume of caustic soda solution of 36° Bé. and 4 parts of sodium hydrosulfite. 100 parts of a mixture of cotton and staple fiber are introduced at 40° C. into the dye-bath thus prepared, 30 parts of common salt are added thereto after ¼ hour and dyeing is continued at 40–50° C. for about 1 hour. The material is squeezed off, oxidized in the air, rinsed as usual, acidified, again rinsed and soaped at the boil for ½ hour. The material is dyed fast rose colored shades.

*Example 5*

The dyestuff obtained according to Example 1 is ground with water and glycerine to a paste containing 12 per cent. of dyestuff and 20 per cent. of glycerine.

150 grams of this paste are made into a printing paste with
700 grams of potassium carbonate thickening containing in 100 parts
    11 parts of wheat starch
    17 parts of water
    25 parts of tragacanth (6 per cent. aqueous)
    20 parts of British gum
    17 parts of potassium carbonate
    10 parts of glycerine
and which was boiled for ½ hour and
150 grams of sodium formaldehyde sulfoxylate.

1000 grams

Cotton, wool or other vegetable, animal or artificial fibers are printed in usual manner, steamed in a Mather Platt ager, rinsed and soaped at the boil. The same rose colored shades of the same fastness properties are obtained as with the dyestuff from 6-chloro-7-methylthioindoxyl.

What I claim is:

Mixtures consisting of the isometric dyestuffs of the formulae

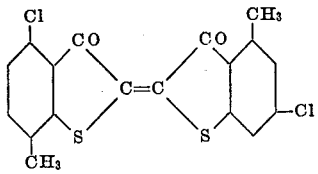

and

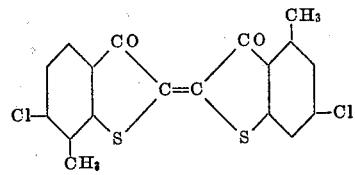

containing substantially one third of the first named component.

FRITZ GRIESHABER.

REFERENCES CITED

The following references are of record in the file of this patent:

UNITED STATES PATENTS

| Number | Name | Date |
|---|---|---|
| 1,818,878 | Arbogast | Aug. 11, 1931 |
| 1,826,721 | Bauer | Oct. 13, 1931 |
| 1,990,010 | Stocklin | Feb. 5, 1935 |
| 2,342,191 | Grossman | Feb. 22, 1944 |

FOREIGN PATENTS

| Number | Country | Date |
|---|---|---|
| 163,280 | Switzerland | Oct. 2, 1933 |

Certificate of Correction

Patent No. 2,539,737								January 30, 1951

FRITZ GRIESHABER

It is hereby certified that error appears in the printed specification of the above numbered patent requiring correction as follows:

Column 2, line 3, for "ocmponents" read *components*; line 5, after the word "hydroxythionaphthene" strike out the period; column 6, line 8, for "isometric" read *isomeric*;

and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*